United States Patent
Weller (10) Patent No.: US 11,557,139 B2
(45) Date of Patent: Jan. 17, 2023

(54) MULTI-STEP DOCUMENT INFORMATION EXTRACTION

(71) Applicant: SAP SE, Walldorf (DE)

(72) Inventor: Tobias Weller, Buseck (DE)

(73) Assignee: SAP SE, Walldorf (DE)

( * ) Notice: Subject to any disclaimer, the term of this patent is extended or adjusted under 35 U.S.C. 154(b) by 218 days.

(21) Appl. No.: 16/574,512

(22) Filed: Sep. 18, 2019

(65) Prior Publication Data

US 2021/0081664 A1 Mar. 18, 2021

(51) Int. Cl.
*G06F 40/226* (2020.01)
*G06V 30/416* (2022.01)
*G06F 40/263* (2020.01)
*G06V 30/148* (2022.01)
*G06V 30/10* (2022.01)

(52) U.S. Cl.
CPC .......... *G06V 30/416* (2022.01); *G06F 40/226* (2020.01); *G06F 40/263* (2020.01); *G06V 30/153* (2022.01); *G06V 30/10* (2022.01)

(58) Field of Classification Search
CPC .............. G06K 9/00469; G06K 9/344; G06K 2209/01; G06F 40/226; G06F 40/263; G06F 40/00; G06V 30/416; G06V 30/153; G06V 30/10; G06V 30/40
See application file for complete search history.

(56) References Cited

U.S. PATENT DOCUMENTS

| 7,149,347 | B1 | 12/2006 | Wnek |
| 7,987,416 | B2 | 7/2011 | Loeser et al. |
| 8,244,661 | B1 | 8/2012 | Komissarchik et al. |
| 8,954,359 | B2 | 2/2015 | Huang et al. |
| 9,348,811 | B2 | 5/2016 | Hartl et al. |
| 2004/0078756 | A1* | 4/2004 | Napper .................. G06K 9/222 715/225 |
| 2007/0168382 | A1* | 7/2007 | Tillberg ............. G06K 9/00449 |
| 2012/0185368 | A1* | 7/2012 | Schloter ................. G06Q 40/00 705/30 |
| 2018/0144042 | A1 | 5/2018 | Sheng et al. |
| 2018/0165272 | A1* | 6/2018 | Pasquini ............... G06F 40/263 |
| 2019/0050639 | A1 | 2/2019 | Ast |

* cited by examiner

*Primary Examiner* — Sanchita Roy
(74) *Attorney, Agent, or Firm* — Buckley, Maschoff & TalwalkarLLC (57) ABSTRACT

Briefly, embodiments of a system, method, and article for receiving a document from a remote device and identifying items in the document. Various operations may be performed based on one or more dependencies of the identified items. For example, additional items may be identified in the document. One or more of the identified items may be parsed. A correspondence between the identified items and a second set of items may be determined. The identified items may be validated based on a set of rules. One or more of the identified items may be transmitted to the remote device in response to the performance of the various operations.

20 Claims, 7 Drawing Sheets

New Car- Brand

*Where customers come first*

1-11 Somehighway, Cloudcity CC 0200

PO Box 123 Drawin CC 0201

P(00) 01234567 F(00) 1234568
Newparts@newcarbrand .com.cc

ABN: 11 000 222  CAN: 010 101 110

Parts tax invoice

| Invoice No. | P123456 |
|---|---|
| Page | 1 |
| Printed | 09012018 |
| Customer | 29643 |
| Type | Account |
| Customer P.O. | ABCDEF |
| Sales Rep. | 11 |
| Document number | ORC122 |

| Invoice To: |
|---|
| Some city place |
| P.O. Box 111222 |
| Nicecity, NC 01234 |

| Payable To: |
|---|
| Fairy land road |
| c/ o Down port |
| OO O'CORN NEIL SON |
| ACC. 001100 |

| Line | Bin | Part | Description | Qty ordered | B/O | Supplied | Price | Unit | Ext.Price |
|---|---|---|---|---|---|---|---|---|---|
| 1 | 222 | 789PQI | Frame sub-assembly | 1 | | 1 | 282.17 | 282.17 | 282.17 |
| | | | | | | | | Tax | 28.22 |
| | | | | | | | | Total | 310.29 |

MULTI-STEP DOCUMENT INFORMATION EXTRACTION

BACKGROUND

Document information extraction is a service which extracts structured information from unstructured documents. For example, document information extraction may be utilized within a business environment to extract structured information from documents such as invoices, sales orders, delivery notes, payment advices.

In one example, a company may receive invoices from various vendors and may need to extract certain information from these invoices for accounting purposes, such as to ensure that the invoices are paid and are properly recorded. The extracted information may include information such as an invoice number, invoice date, and invoice amount. If the company is relatively small, for example, a single person may be able to manually extract such information from invoices in a relatively time-efficient manner. However, if the company is relatively large, such as a company which receives hundreds (or more) of invoices each week, a single person or a small number of persons may be unable to extract information from the invoices in a time-efficient manner. Moreover, even if a single person or a small number of persons are able to perform such manual tasks, a potential for human error still exists.

In current document extraction processes, information is initially extracted from a document, such as to generate a string of data, such as names, currency, invoice number, and so forth. The information may be parsed into a particular language and formatted into an independent data type, e.g., so that dates such as "Oct. 12, 2018" and "12 Oct. 2018" are each passed into an independent format such as "2018-10-12." The parsed information may be matched to master data, so that a client name such as "ABC Corp." is matched to a customer identifier (ID) such as customer ID 1010, based on a list of master data which has been provided by a customer, for example. The extracted information may also be validated based on business rules. For example, the validation may be performed to ensure that an invoice date extracted from the document is not earlier than the present date on which the information is extracted.

A drawback of current systems, however, is that the extraction, parsing, matching and validating operations are performed in parallel. By performing these operations in parallel, no one operation is aware of other operations running in parallel and therefore any knowledge gained in one of the operations cannot be reused in any other operation. Accordingly, current systems are therefore prone to errors or inaccuracies in information extraction.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

One or more embodiments as discussed herein are directed to an automated process for information extraction from one or more electronic documents. For example, information may be extracted from electronic documents such as invoices, orders, or delivery notes, to name just a few examples among many. Such documents may be received from various entities, such as vendors and such documents may differ from entity to entity. For example, different vendors may utilize different electronic document invoices or forms and such different electronic documents may not utilize a standardized format. For example, different vendors may use a different numbering format for an invoice, or some vendors may print an invoice number on the upper right hand side of an invoice, whereas other vendors may print an invoice number on the lower right hand side of the invoice. Moreover, some invoices may have an invoice number which is comprised entirely of numbers, whereas other invoices may include one or more letters or other alphanumeric characters other than numbers or letters. Additionally, some invoices may use a certain font, such as "Times New Roman," whereas other invoices may use a font such as "Arial." Some invoices may also use different font sizes or a different bolding schemes. Some invoices may also use a different coloring scheme or a different language. For example, an invoice from a German company may be printed in the German language, whereas an invoice from a company in the United States of America may be printed in the English language. Additionally, different invoices may use different currency amounts. For example, an invoice of a German company may list an amount due is Euros, whereas an invoice for a company in the United States of America may list an amount in U.S. Dollars, and an invoice for a company in Australia may list an amount due in Australian Dollars. Similarly, different invoices may utilize a different date format. For example, for some invoices, a date such as "8/10/19" may signify "Aug. 10, 2019," whereas this date may instead signify "Oct. 8, 2019" for different invoices.

An "electronic document" or "document," as used herein, refers to an item of any electronic media content for use either in an electronic form or as a printed output. An electronic document may comprise a document related to functioning of a business concern, such as an invoice, order, delivery note, or instructions, to name just a few examples among many.

A process in accordance with one or more embodiments may perform extraction, parsing, matching, and validating operations, for example, to extract information from an electronic document. Such as process may comprise a machine-learning process, for example, where information learned in one operation may influence a determination or decision made in a subsequent operation. "Extraction" or "information extraction," as used herein, refers to a process for automatically identifying and acquiring structured information from unstructured and/or semi-structured machine-readable documents. For example, extraction may comprise optical character recognition to identify and acquire character text, strings, and/or phrases from an electronic document.

"Parsing," as used herein, refers to a the process of analyzing a string of symbols, such as alphanumeric characters, such as in a natural language, computer languages or data structures, conforming to certain rules, such as grammar rules. Parsing may comprise converting information into an independent data type of format. For example, parsing may convert a date expression such as "Apr. 28, 2018" into an independent data format such as 2018-04-28.

"Matching," as used herein, refers a process for determining a correspondence between certain items, such as an extracted string of items or symbols, and another set of items or symbols. For example, matching may comprise parsing extracted information to a set of master data. If, for example, a customer name such as "ABC Corp." is extracted from an electronic document, a correspondence or match between "ABC Corp." and an identifier (ID) in a master set of data may be determined. For example, a master set of data may indicate that an ID for "ABC Corp." is "ID 1010." Accordingly, a matching operation may be performed to determine that "ABC Corp." matches or corresponds to "ID 1010" based on the master set or list of data, for example. A master set of data may be stored in a file or in some other data or information structure in a memory device, such as a memory device accessible by a server, such as a cloud-based server, for example.

"Validating" or "validation," as used herein, refers to a process for determining or otherwise identifying a validity or accuracy of extracted information based on certain rules, such as business-related rules. For example, a process for validating a date extracted from an electronic document may ensure that an extracted date on an invoice is not later than a present date. For example, if a date extracted from an invoice indicates that the invoice was printed on Nov. 10, 2019, whereas the present date is earlier, such as Aug. 19, 2019, it may therefore be determined that the extracted date is inaccurate. For example, the validation may determine that either the wrong date was extracted from the electronic document or that the electronic document otherwise contains an erroneous date.

A process in accordance with one or more embodiments may perform extraction, parsing, matching and validating operations serially so that knowledge gained during one of the operations may be utilized to improve the accuracy of a subsequent operation, for example. In one example embodiment, if it determined that an invoice originated in an Australian company, this knowledge may be utilized by a subsequent validation operation, for example, to identify that indication of "$100,000" in an amount of the invoice likely refers to Australian Dollars as opposed to U.S. Dollars.

In accordance with an embodiment, a multi-step approach is provided where extraction and validation steps are performed in a sequence so that the results of previous operations or steps can be used to improve later ones. For example, much of the extracted information in a document may be dependent on a country in which a vendor who originated the document is located. By determining the country first, for example, information in the document which has a relatively high dependency on the country, such as currency, date format, taxes, number format, local business requirements, and so forth may be identified with improved accuracy.

In accordance with one or more embodiments, for example, inaccuracies in information extraction due to errors in the character recognition, errors in the document itself, or in follow up processing may be reduced as discussed here. For example, in accordance with one or more embodiments, an accuracy of information identification and extraction may be improved.

An approach in accordance with an embodiment, as discussed herein, may extract structured information out of unstructured documents such as invoices, where dependencies in the content, such as between items of information, are considered. By accounting for such dependencies, for example, a machine-learning approach may be performed which is similar to the way in which a human would extraction information or make decisions based on all available information instead of being limiting to a narrow view of the document, for example. If given a date string such as "02-03-18," it is impossible (even for a human) to know whether the date of this string refers to "2nd March 2018," "3rd February 2018," or "18th March 2002," for example. However, if it is known that this date string is included in an electronic document which originated in the United States, for example, it is likely that the date format is Month-Day-Year. Accordingly, based on the country of origin of the electronic document, the date format may be determined with a relatively high degree of accuracy. Increasing the accuracy of information extraction may help to automate document processing workflows to a much higher extent and with a higher accuracy than may be possible if such dependencies were not considered.

Figure 1:
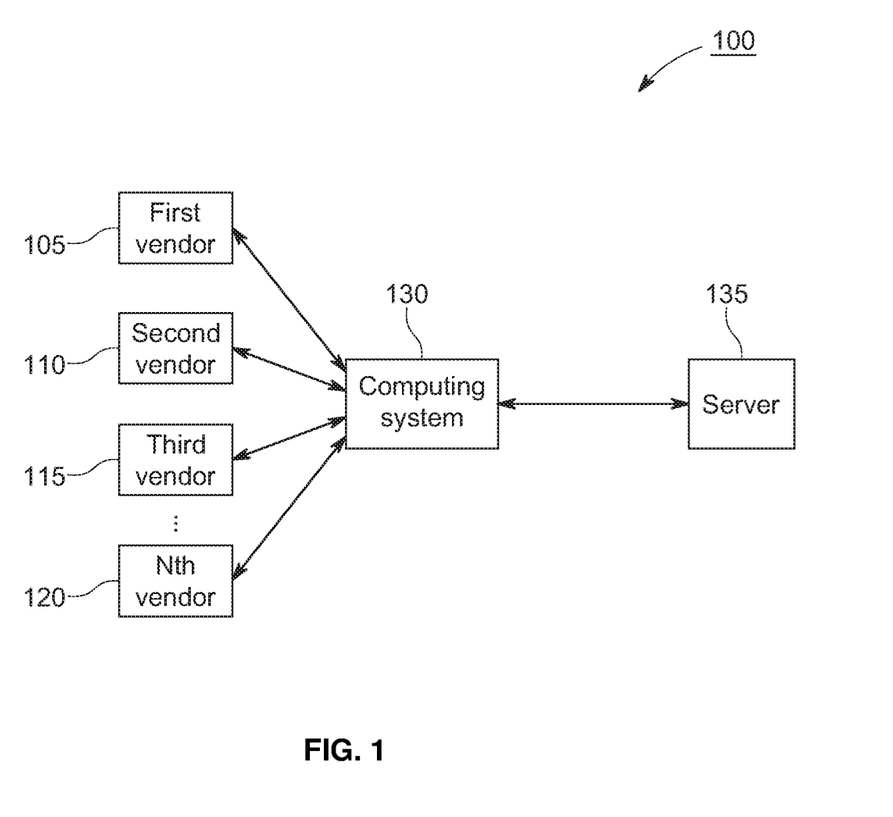
FIG. 1 illustrates an embodiment of a system for performing information extraction from one or more electronic documents.

FIG. 1 illustrates an embodiment 100 of a system for performing information extraction from one or more electronic documents. As shown, embodiment 100 may include various vendors such as a first vendor 105, a second vendor 110, a third vendor 115, and an Nth vendor 120. Such vendors may transmit or otherwise provide one or more electronic documents to computing system 130, such as a computer of a customer, for example. Although only four vendors are illustrated FIG. 1, it should be appreciated that more or fewer than four vendors may be included in an embodiment. Moreover, entities other than vendors, such as customers, may also be included in some embodiments. For example, any entity sending an electronic document to computing system 130 may be included in some embodiments. It should also be appreciated that vendors may communication electronic documents to computing system 130 via a network, such as the Internet, for example.

Computing system 130 may upload or otherwise transfer electronic documents to one or more servers, such as server 135. Server 135 may comprise one or more cloud-based servers or other computing devices capable of analyzing or otherwise processing electronic documents in some embodiments. As discussed above, an information extraction process may be performed by server 135 to automatically identify and extract information from the electronic documents. For example, computing system 130 may upload or otherwise transmit electronic documents to server 135 where the electronic documents may be processed to identify and extract information. In some embodiments, the extracted information may be parsed, matched, and/or validated, for example.

Figure 2:
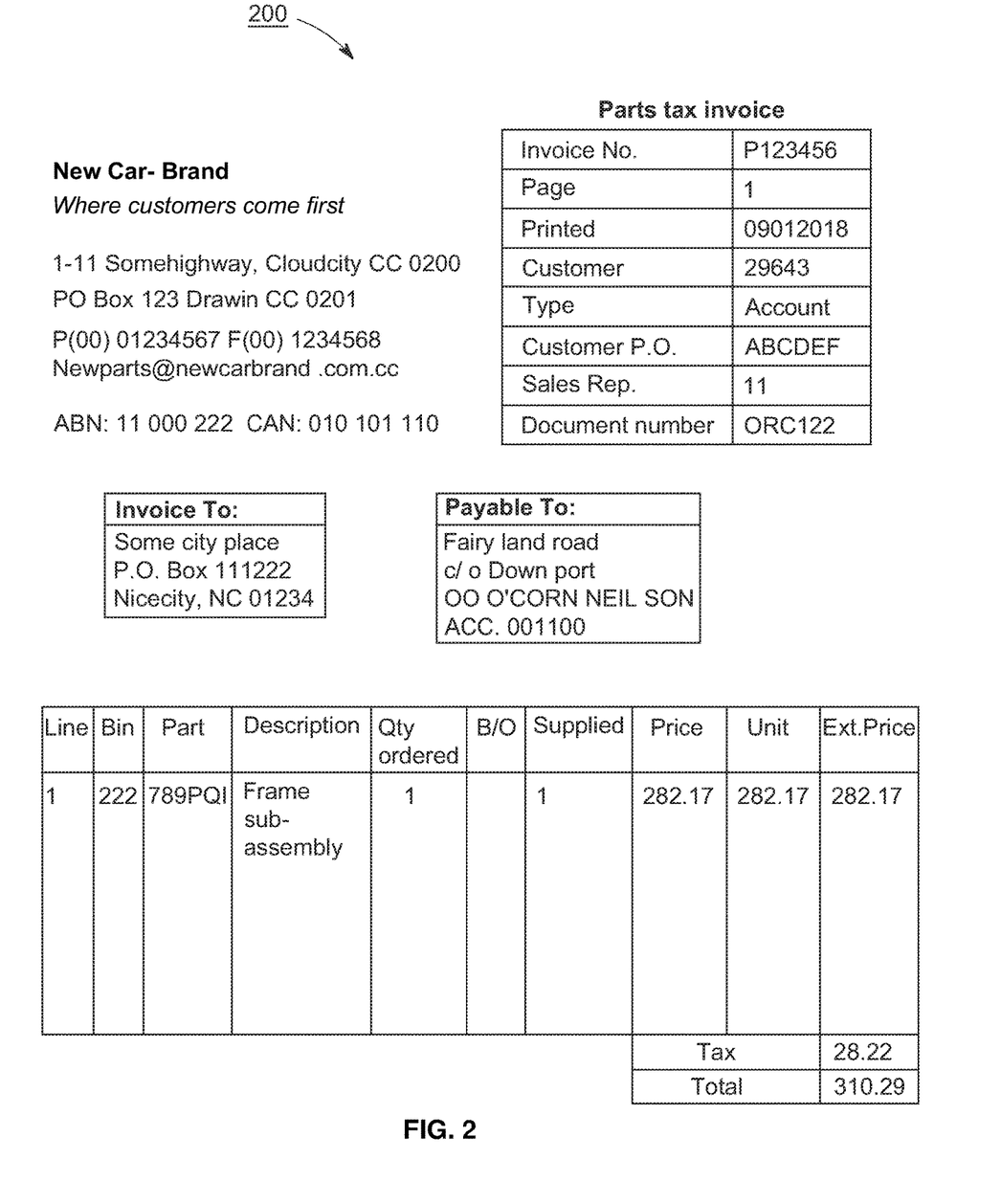
FIG. 2 illustrates an electronic document in accordance with an embodiment.

FIG. 2 illustrates an electronic document 200 in accordance with an embodiment. In this embodiment, electronic document 200 comprises an invoice, such as a "parts tax invoice" as is illustrated in FIG. 2. Electronic document 200 may be received by a customer from a vendor, for example. As discussed above, a customer receiving electronic document 200 may upload or otherwise transmit or transfer electronic document to a server or other computing device for processing, such as to extract information from the electronic document 200. For example, information extracted from electronic document 200 may be utilized by an accounting department of a customer for tax purposes, to ensure that a corresponding vendor is paid or goods and/or services, or for other purposes of record-keeping. As discussed above, a customer receiving electronic document 200 may receive many electronic documents from different vendors in different countries around the world and an information extraction process may be performed to extract information as accurately as possible, for example. In this example embodiment, electronic document 200 lists a street address but does not list a country of the vendor. Moreover, electronic document 200 lists a date which is was printed as "09102018," but without any context, there is no way of being certain as to whether this date refers to "Sep. 10, 2018," as would likely be the case for a vendor located in the United States, or "Oct. 9, 2018," as would likely be the case for a vendor located in Germany, for example. Moreover, a currency for an amount due which the electronic document refers to as "TOTAL" may not be knowable without context. For example, because a currency symbol is omitted, there is no way of knowing for certain whether the amount due is in terms of a currency such as U.S. Dollars, European Euros, Japanese Yen, or Chinese Yuan, or Australian Dollars, for example. However, certain information located on electronic document may be utilized to determine information about a vendor with a higher level of accuracy than would be possible it processing were done in parallel. For example, if a country of origin of the vendor is inferred or otherwise determined, certain information such as the formatting for the date or a currency for an amount due may be determined with a higher level of accuracy than may be possible if a country of origin of the vendor is unknown.

Electronic document 200 lists certain information which may be utilized to determine or identify a country of origin of a vendor. For example, an email address shown on electronic document is "Newparts@newcarbrand.com.cc".

If, for example, it is known or otherwise determined that an email address ending in ".com.cc" refers to an email address for a company in Australia, it may be inferred that a vendor associated with electronic document 200 may be located in Australia. Certain other information located on the electronic document 200 may also be utilized to identify a country of origin, such as the inclusion of an "ABN" number, which may refer to an "Australian Business Number." In this example embodiment, "ABN: 11 00 222" is shown on electronic document 200, thereby giving an indication that an associated vendor is likely located in Australia. Of course, other information shown on electronic document 200 may also give indications of a country of origin in some embodiments, such as formatting of numbers of a phone or fax number, or of a street address, for example. However, in this example, the formatting of the phone or fax number or of the street address may not directly give indications of a country of origin of electronic document 200.

If a country of origin has been determined or otherwise identified, certain country-specific facts or items of information may subsequently be extracted from electronic document 200. For example, information such as a tax amount which is specific to a particular country may be extracted. In this example, a tax amount of "28.22" may be extracted from electronic document.

Certain information may also be parsed after determining a country of origin such as a date associated with electronic document 200. For example, it may be determined that date "09102018" refers to "Oct. 9, 2018" instead of "Sep. 10, 2018" because a vendor associated with electronic document 200 is determined to likely be located in Australia, where day is typically listed before a month in a date format.

Extracted information may subsequently be validated. For example, extracted items of information may be compared against business rules to determine their validity. In one example, if an extracted date of an invoice is later than today's date, it may be inferred that the date of the invoice is incorrect or is otherwise invalid, for example. With respect to electronic document 200, if it is determined that a vendor associated with electronic document 200 is Australian, an amount of tax listed on electronic document 200 may be validated. If, for example, it is known that a tax on goods in Australia is 10.0%, an amount of tax shown on electronic document 200 may be validated. In this example embodiment, a price for goods is 282.17, so at a tax rate of 10.0%, the amount of tax listed should be about 28.22, which is the exact amount shown on electronic document 200. Accordingly, in this example embodiment, a validation operation may determine that an amount of tax listed on electronic document 200 is accurate.

Figure 3:
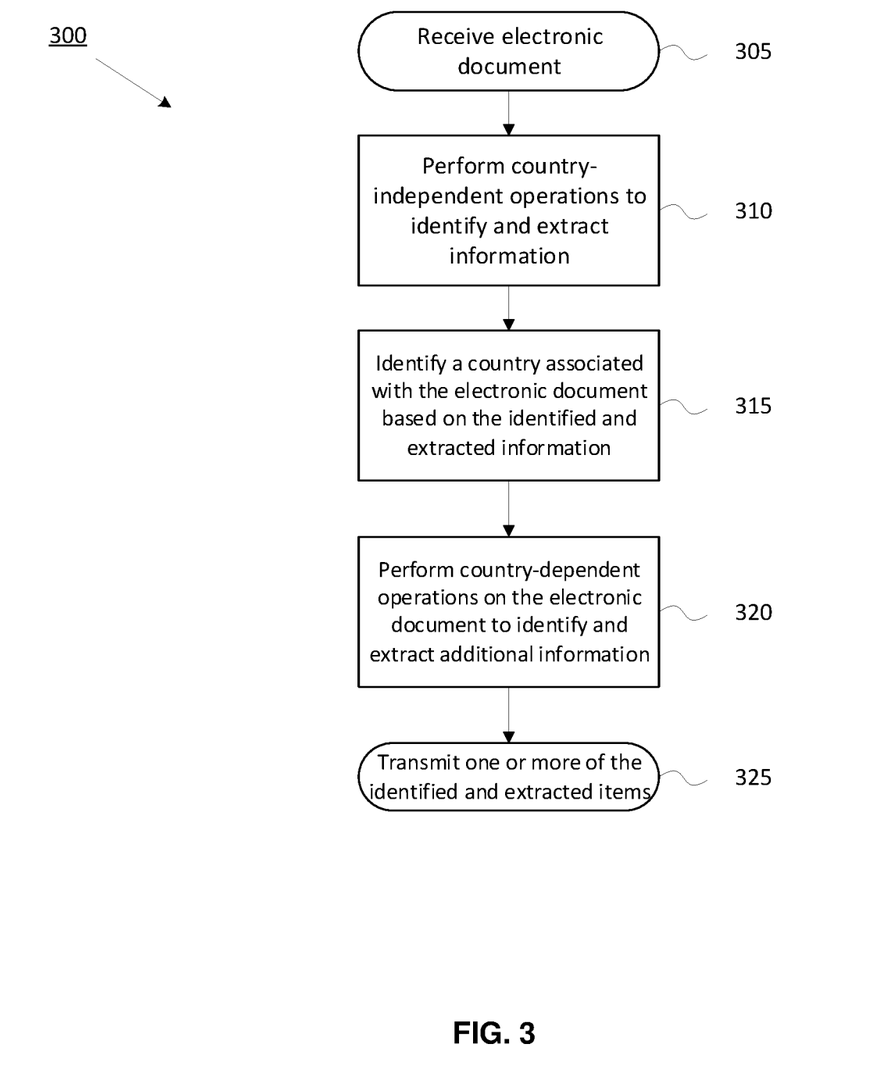
FIG. 3 is an embodiment of a flowchart of a process for processing an electronic document to identify and extract items of information based in part on country-specific dependencies.

FIG. 3 is an embodiment 300 of a flowchart of a process for processing an electronic document to identify and extract items of information based in part on country-specific dependencies. Embodiments in accordance with claimed subject matter may include all of, less than, or more than blocks 305 through 325. Also, the order of blocks 305 through 325 is merely an example order. For example, a method in accordance with embodiment 300 may be performed at a server which receives electronic documents from one or more customers.

At operation 305, an electronic document may be received. At operation 310, one or more country-independent operations may be performed to identify and extract items of information. For example, a country-independent operation may comprise an operation upon which a country of origin associated with the electronic document has no bearing, weight, or influence. At operation 315, a country associated with the electronic document may be identified or otherwise determined based on the identified and extracted items of information. For example, as discussed above with respect to electronic document 200 of FIG. 2, an email address or a particular tax ID may be included in the electronic document 200 which may provide clues as to a country of origin associated with the electronic document. At operation 320, country-dependent operations may be performed on the electronic document to identify and extract additional items of information. For example, by performing country-dependent operations after identifying a country of origin of the electronic document, the identification and extraction of items of information from the electronic document may be performed with improved accuracy. For example, information learned or otherwise delved from an electronic document at country-independent operations 310 may therefore be utilized to influence a determination or an outcome of country-dependent operations 320. At operation 325, one or more of the identified and extracted items of information may be transmitted to a customer, such as to a customer's computing system or device. For example, the one or more identified and extracted items of information may comprise a string of characters or information transmitted to the customer's computing system or device. For example, such items of information may be utilized by an accounting application or other software running or implemented by the customer's computing system or device, for example.

Figure 4:
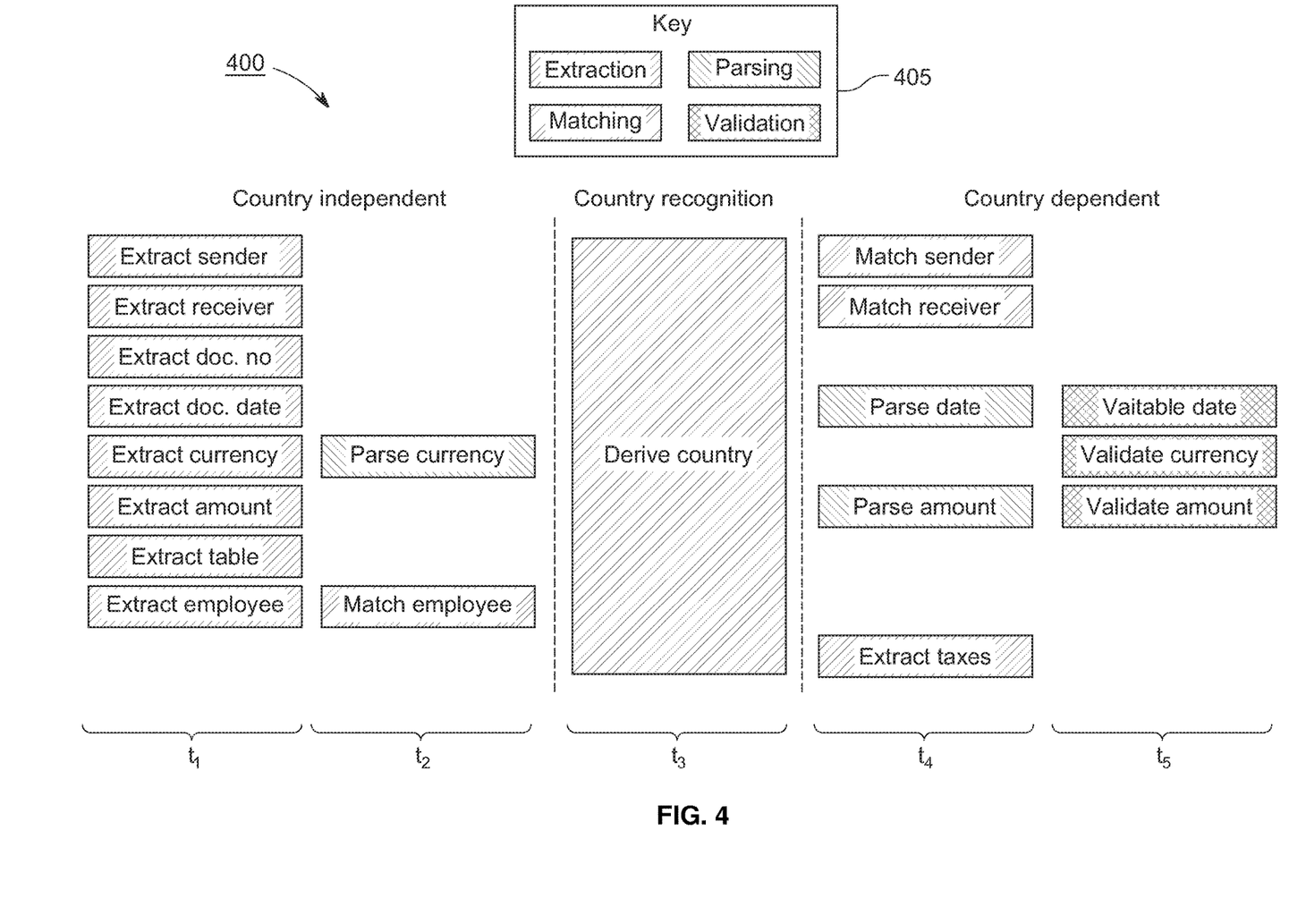
FIG. 4 illustrates an embodiment of a workflow of a process for processing an electronic document to extract information based in part on country-specific dependencies.

FIG. 4 illustrates an embodiment 400 of a workflow of a process for processing an electronic document to extract information based in part on country-specific dependencies. A key 405 illustrates the shading or color for different boxes corresponding to operations such as extraction, parsing, matching, and validation, for example. Various time intervals or time periods are shown in embodiment 400, including time intervals $t_1$, $t_2$, $t_3$, $t_4$, and $t_5$, for example. Although five time intervals are shown in embodiment 400, it should be appreciated that in other embodiments, more or fewer than five time intervals may be included in a workflow.

At time interval $t_1$, certain extraction operations may be performed. As illustrated, a sender and a receiver of an electronic document may be extracted. Extraction of the sender and/or receiver may include, for example, extraction of a name, address, tax ID, e-mail, and/or bank account, to name just a few examples among many. Other items of information may also be extracted, such as a document number, a document data, a currency, an amount, a table, and an employee name or ID, for example.

Tables A and B as shown below list various items of information which may be extracted, for example. As illustrated, Tables A and B may list descriptions for various fields, such as "invoiceNo," "invoiceDate," "subtotalAmount," "totalAmount," "shippingAmount," "discount," "currency," "dueDate," "tax1Amount," "tax2Amount," "tax3Amount," "tax1Rate," "tax2Rate," "tax3Rate," "tax1Description," "tax2Description," "tax3Description," "paymentTerms," "deliveryDate," "vendorName," "vendorAddress," "vendorTaxID," "vendorBankAccountNo," "buyerName," "buyerAddress,":puchaseOrderNo," "employeeName," "shipToAddress," "deliveryNoteNo," "comments," and "language," to name just a few examples among many. Each field may be associated with a corresponding description. Multiple fields may be associated with a particular group, such as "Invoice," "amount," "taxAmount," "taxRate," "taxDescription," "vendor," or "buyer," for example.

TABLE A

| Group | Field | Description |
|---|---|---|
| Invoice | invoiceNo | Invoice number |
| | invoiceDate | Date of the invoice in extended ISO 8601 notation (YYYY-MM-DD) |
| Amount | subtotalAmount | Amount before taxes and shipping/handling costs |
| | totalAmount | Sum of subtotal, taxes, special handling charges, and shipping charges, before discounts, or Total amount due and payable |
| | shippingAmount | The shipping or handling amount. |
| | discount | Discount to be applied to the invoice. (May be related to early payment) |
| | currency | Currency of the invoice, in ISO-3 format (e.g. USD, EUR, AUD) |
| | dueDate | Due date of the payment if mentioned on the invoice in ISO format |
| taxAmount | tax1Amount | Primary tax applied to this invoice. (Typically, a federal tax) |
| | tax2Amount | Secondary tax applied to this invoice. (Typically, a state or municipal tax). Only available in few countries. |
| | tax3Amount | Tertiary tax applied to this invoice. (Or Federal tax in cross-state/cross province invoices). Only available in very few countries. |
| taxRate | tax1Rate | Primary tax rate applied to the invoice. |
| | tax2Rate | Secondary tax rate applied to the invoice. |
| | tax3Rate | Tertiary tax rate applied to the invoice. |
| taxDescription | tax1Description | Type of the primary tax. E.g. "California sales tax" |
| | tax2Description | Type of the secondary tax. E.g. "California sales tax" |
| | tax3Description | Type of the tertiary tax. E.g. "California sales tax" |
| | paymentTerms | Terms outlining how and when the invoice should be paid and if discounts are applicable. E.g. "Net 30" |

TABLE A-continued

| Group | Field | Description |
|---|---|---|
| | deliveryDate | Terms outlining how and when the invoice should be paid and if discounts are applicable. E.g. "Net 30" |

TABLE B

| Group | Field | Description |
|---|---|---|
| Invoice | vendorName | Name of the sender of the invoice (typically the sending company). E.g. "SAP SE" |
| | vendorAddress | Address of the sender, only one box for vendor street, city and country |
| | vendorTaxId | Tax identifier of the vendor's business entity. Unique to each vendor. |
| | vendorBankAccountNo | Bank account number of the vendor. E.g. the IBAN |
| Buyer | buyerName | Name of the buyer of the invoice (typically the sending company). E.g. "SAP SE" |
| | buyerAddress | Address of the receiver, only one box for buyer street, city and country |
| | purchaseOrderNo | Number of the buyer's purchase order if mentioned. |
| | employeeName | Name of the person the invoice was send to. Often referred to as "Attention to: ABC"/"Attn: ABC" |
| | shipToAddress | The ship to address. Only if explicitly mentioned and different from the buyer's address |
| | deliveryNoteNo | Number of the delivery note related to the invoice. |
| | comments | This is for additional information from the supplier. For example, the field can provide details about the status of a back ordered item or inform the buyer that the invoice differs from the related PO in some ways. |
| | language | Language used in the invoice, in ISO-3 format. (English - ENG, Spanish - SPA, etc.) |

Referring back to FIG. 4, at time interval $t_2$, certain parsing and matching operations may be performed. For example, a currency may be parsed at time interval $t_2$, and an employee may be matched with master data. For example, a matching process may determine an employee ID or other information for an extracted employee.

At time interval $t_3$, a country associated with the electronic document may be derived. For example, based on the parsed currency and the matched employee information, a determination may be made as to the associated country. For example, if the currency relates to Euros and the employee as an employee ID which is associated with a German customer or client, it may be inferred that the electronic document is likely associated with Germany, such as German conventions or information.

At time interval $t_4$, additional matching, parsing, and extraction operations may be performed. For example, an extracted sender and a receiver may be matched with a list of master data. A date and an amount may also be parsed. For example, if the date and the amount are in some way dependent upon a country associated with the electronic document, then accuracy in the information extraction may be increased by parsing the date and/or the amount after determining or identifying a country associated with the electronic document. Similarly, taxes may be extracted after determining the country associated with the electronic document. For example, taxes may differ per country such that in Germany there may be only one tax, whereas in other jurisdictions such as in Canada or India, there might be country and provincial taxes, in which case there may be multiple different taxes listed on the same invoice which need to be extracted. By knowing the country, for example, a system may know whether to extract one or N different taxes and may additionally validate whether these taxes are correct.

At time interval $t_5$, various validation operations may be performed. For example, the date, currency, and amount may be validated. For example, based on the parsed currency, date, and amount, and other information extracted from the electronic document, this parsed information may be validated based on a list of certain business rules.

It should be appreciated, however, that a process or workflow in accordance with FIG. 3 or 4 does not need to be limited to country dependent extraction. A similar approach may be enhanced by recognizing additional dependencies and building a more complex pipeline, such as is discussed below with respect to FIGS. 5 and 6.

For example there are a number of potential dependencies which may be known. For example, knowing the sender of an electronic document may provide a relatively good indication of the layout of the electronic document, so with enough data or information, sender-specific models may be trained.

Knowledge about a date of an electronic document may also be useful, such as a date on which the electronic document was created and may assist in validation of certain information and may provide support for various different models, because a sender might have changed the layout of the electronic document at a certain point in time and therefore having time dependent machine learning models may enhance the accuracy even further.

Knowledge about a sender of an electronic document may also limit a number of possible employees which may be referenced in the electronic document. Accordingly, knowledge about the sender of the electronic document may therefore assist in employee name extraction and matching operations.

Knowledge about particular products being listed on an electronic document such as an invoice may assist in extraction and validation of taxes that are listed on the electronic document because those products might be subject to certain specific taxes. Knowledge about the particular products listed on an invoice may also be useful for validation of shipping costs.

Figure 5:
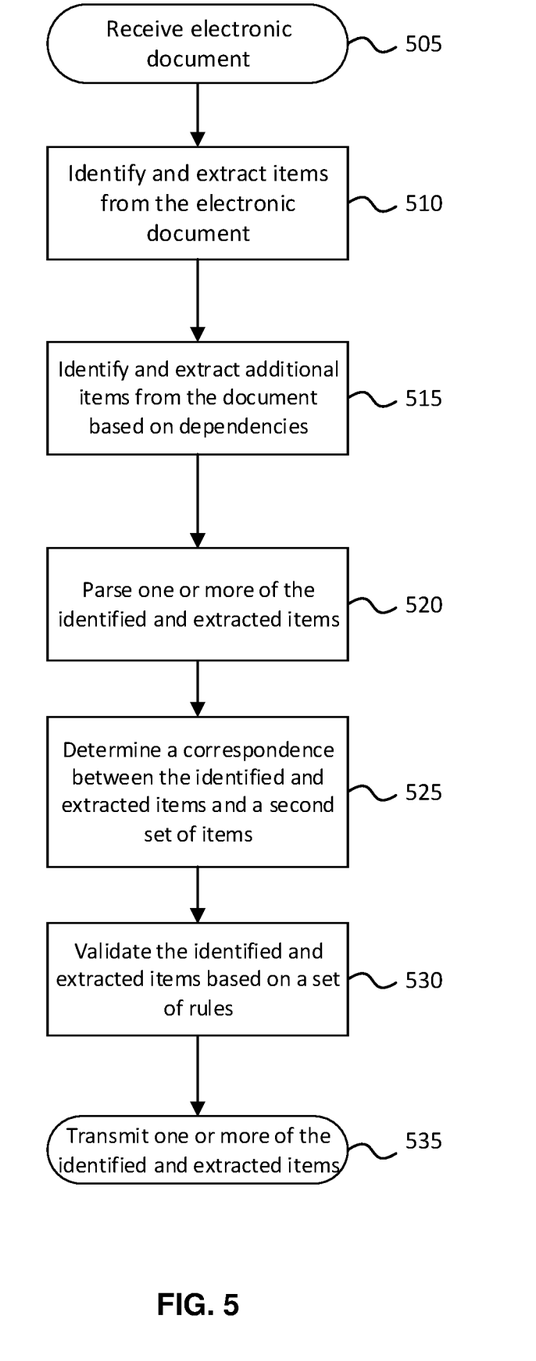
FIG. 5 is an embodiment of a flowchart of a process for processing an electronic document to identify and extract items of information based in part on various dependencies.

FIG. 5 is an embodiment 500 of a flowchart of a process for processing an electronic document to identify and extract items of information based in part on various dependencies. For example, such dependencies may be known a priori. Embodiment 500 of FIG. 5 provides a more generalized process than embodiment 300 of FIG. 3, as embodiment 500 is not necessarily based on country-specific dependencies. Embodiments in accordance with claimed subject matter may include all of, less than, or more than blocks 505 through 535. Also, the order of blocks 505 through 535 is merely an example order. For example, a method in accordance with embodiment 500 may be performed at a server which receives electronic documents from one or more customers.

At operation 505, an electronic document may be received. At operation 510, items of information may be identified and extracted from the electronic document. For example, certain items of information which are independent from other items of information in the electronic document may be identified and extracted at operation 510. At operation 515, additional items of information may be identified and extracted from the electronic document based on the dependencies. For example, an accuracy in terms of identification and extraction may be improved or increased for such additional items of information if they are identified and extracted after initial items of information are identified and extracted, such as where there is a known dependency between the additional items of the information and the initial items of information. For example, if an ID of a sender is initially identified and extracted, and it is known that the ID of the sender is associated with sales within certain specific industries or to certain specified countries, such knowledge may be utilized to subsequently extract an ID of a receiver of the electronic document with improved accuracy.

At operation 520, one or more of the identified and extracted items of information may be parsed. For example, if a currency and a particular sender associated with sales to a particular country are initially extracted at operations 510 and 515, respectively, the parsing of the currency associated with the electronic document may subsequently be performed with improved accuracy at operation 520.

At operation 525, a correspondence between the identified and extracted items of information and a second set of items may be performed. For example, a matching operation may be performed between the identified and extracted items of information and the second set of items, such as a set of master data.

At operation 530, the identified and extracted items of information may be validated based on a set of rules, such as based on a set of business-related rules. For example, if is it known that the ID of the sender is associated only with sales to Spain, but other identified and extracted items indicate that the electronic document relates to a transaction in Germany, the ID of the sender may not be validated. In other words, it may be inferred that the ID of the seller is incorrect, for example.

At operation 535, the one or more of the identified and extracted items of information may be transmitted to a customer, such as to a customer's computing system or device. For example, the one or more identified and extracted items of information may comprise a string of characters or information transmitted to the customer's computing system or device. For example, such items of information may be utilized by an accounting application or other software running or implemented by the customer's computing system or device, for example.

Figure 6:
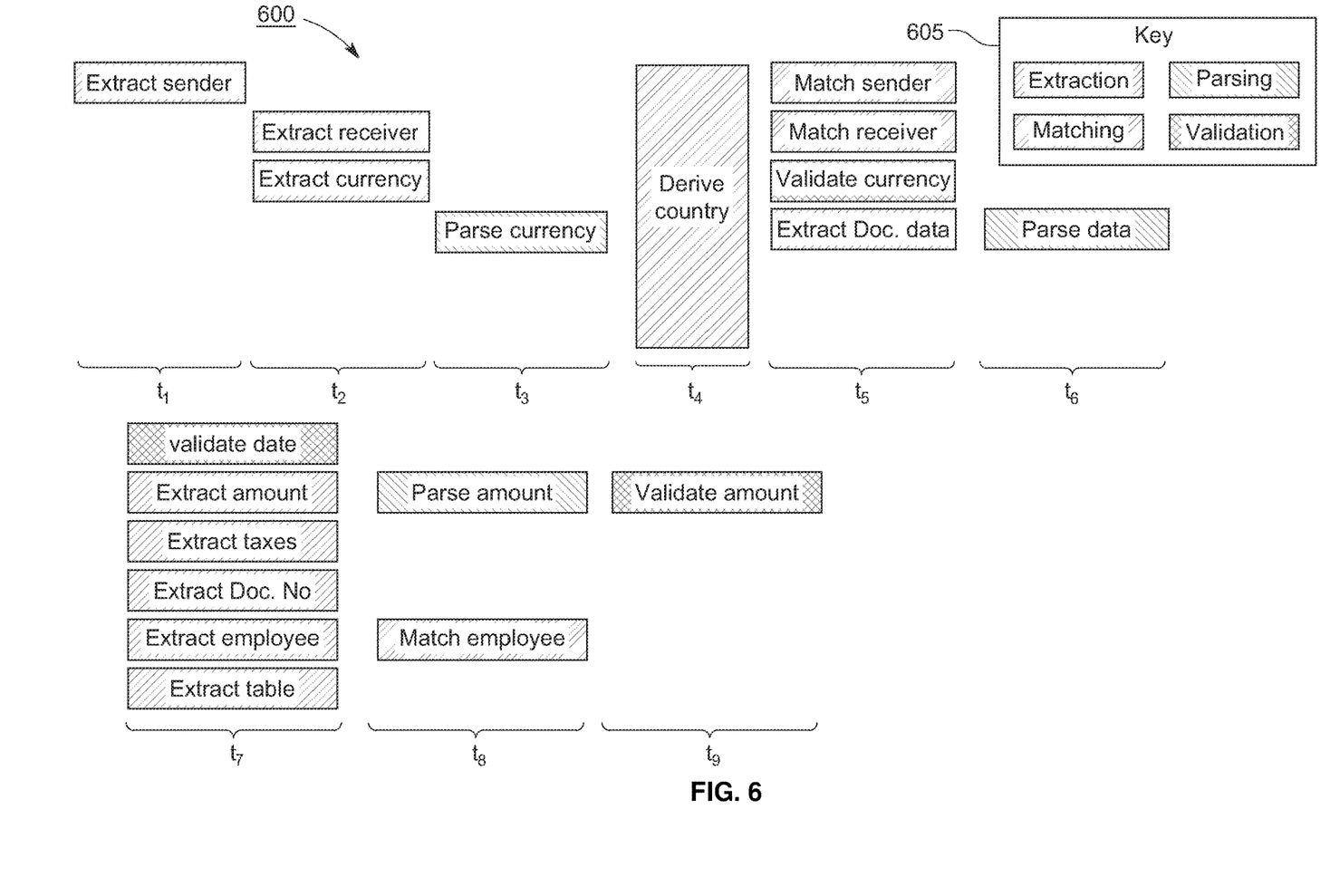
FIG. 6 illustrates an embodiment of a workflow of a process for processing an electronic document to extract information based in part on various dependencies.

FIG. 6 illustrates an embodiment 600 of a workflow of a process for processing an electronic document to extract information based in part on various dependencies. A key 605 illustrates the shading or color for different boxes corresponding to operations such as extraction, parsing, matching, and validation, for example. Various time intervals or time periods are shown in embodiment 600, including time intervals $t_1$, $t_2$, $t_3$, $t_4$, $t_5$, $t_6$, $t_7$, $t_8$, and $t_9$, for example. Although nine time intervals are shown in embodiment 600, it should be appreciated that in other embodiments, more or fewer than nine time intervals may be included in a workflow.

At time interval $t_1$, certain extraction operations may be performed. As illustrated, a sender of an electronic document may be extracted. Extraction of the sender receiver may include, for example, extraction of a name, address, tax ID, e-mail, and/or bank account, to name just a few examples among many.

Next, at time interval $t_2$, an ID of a receiver and a currency may be extracted. As discussed above, if it is known that the ID of the sender determined at time interval $t_1$ is associated with sales within certain specific industries or to certain specified countries, such knowledge may be utilized to subsequently extract an ID of a receiver and a corresponding currency of the electronic document with improved accuracy.

At time interval $t_3$, the currency may be parsed. At time interval $t_4$, a country associated with the electronic document may be derived. For example, based on the parsed currency and the matched sender and/or receiver information, a determination may be made as to the associated country. For example, if the currency relates to Euros and the sender is associated with a sender ID which is associated with a German customer or client, it may be inferred that the electronic document is likely associated with Germany, as may therefore also be associated with German grammar conventions or information.

At time interval $t_5$, additional matching, parsing, and extraction operations may be performed. For example, an extracted sender and a receiver may be matched with a list of master data. The parsed currency may also be validated, and a document date may be extracted. For example, the matching of the sender and receiver, the validation of the currency, and the extraction of the document date may be dependent upon the identification or derivation of the country associated with the electronic document at time interval $t_4$.

At time interval $t_6$, the extracted document date may be parsed. At time interval $t_7$, the document date may be validated, and certain additional information may be extracted, such as an amount corresponding to the electronic document, taxes, an associated employee, and a table, for example.

At time interval $t_8$, the amount may be parsed, and the employee may be matched. For example, a correspondence may be determined between the employee and a list or set of master data. Finally, at time interval t₉, the amount may be validated.

A workflow of a process in accordance with embodiment 600 may identify and extract information items with increased accuracy than may be possible if the information items were extracted in parallel. For example, by performing certain operations at different time intervals in a serial fashion, information learned or delved during a particular time interval may be utilized to determine or delve other items of information during a subsequent time interval with an improved accuracy.

Figure 7:
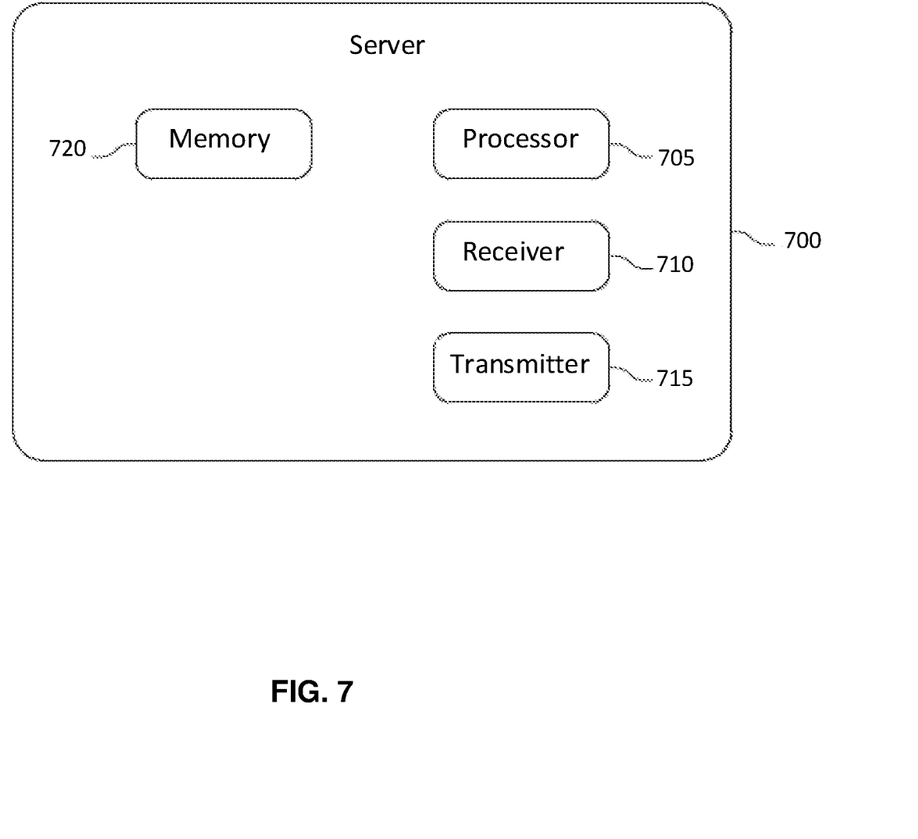
FIG. 7 illustrates a server according to an embodiment.

FIG. 7 illustrates a server 700 according to an embodiment. As discussed above, although only one server is illustrated, it should be appreciated that server 700 may comprise one or more cloud-based application servers, for example. Server 700 may include a processor 705, a receiver 710, a transmitter 715, and a memory 720 to name just a few items among many. For example, processor 705 may execute instructions or code stored in memory 720. In accordance with an embodiment, processor 705 may execute instructions or code stored in memory 720 to perform information extraction on an electronic document, for example. Processor 705 may also perform one or more parsing, matching or correspondence determination, and/or validation operations, for example. Receiver 710 may receive one or more electronic documents, such as from one or more computing systems or devices of one or more customers. For example, the one or more electronic documents may be received via a network such as the Internet. Transmitter 515 may transmit a string of extracted information to a computer system or device of a customer, such as after performing information extraction and/or parsing, matching or correspondence determination, and/or validation operations, for example.

Some portions of the detailed description are presented herein in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated.

It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

It should be understood that for ease of description, a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more illustrative examples; however, again, particular context of description and/or usage provides helpful guidance regarding inferences to be drawn.

A network may also include now known, and/or to be later developed arrangements, derivatives, and/or improvements, including, for example, past, present and/or future mass storage, such as network attached storage (NAS), a storage area network (SAN), and/or other forms of computing and/or device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as computing and/or communication protocols (e.g., network protocols), may interoperate within a larger network. In this context, the term sub-network and/or similar terms, if used, for example, with respect to a network, refers to the network and/or a part thereof. Sub-networks may also comprise links, such as physical links, connecting and/or coupling nodes, such as to be capable to transmit signal packets and/or frames between devices of particular nodes, including wired links, wireless links, or combinations thereof. Various types of devices, such as network devices and/or computing devices, may be made available so that device interoperability is enabled and/or, in at least some instances, may be transparent to the devices. In this context, the term transparent refers to devices, such as network devices and/or computing devices, communicating via a network in which the devices are able to communicate via intermediate devices of a node, but without the communicating devices necessarily specifying one or more intermediate devices of one or more nodes and/or may include communicating as if intermediate devices of intermediate nodes are not necessarily involved in communication transmissions. For example, a router may provide a link and/or connection between otherwise separate and/or independent LANs. In this context, a private network refers to a particular, limited set of network devices able to communicate with other network devices in the particular, limited set, such as via signal packet and/or frame transmissions, for example, without a need for re-routing and/or redirecting transmissions. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet, for example. Although signal packet and/or frame transmissions may employ intermediate devices of intermediate nodes to exchange signal packet and/or frame transmissions, those intermediate devices may not necessarily be included in the private network by not being a source or destination for one or more signal packet and/or frame transmissions, for example. It is understood in this context that a private network may provide outgoing network communications to devices not in the private network, but devices outside the private network may not necessarily be able to direct inbound network communications to devices included in the private network.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

What is claimed is:

1. A method, comprising:
   receiving a document from a remote device;
   identifying a first set of items in the document, the first set of items comprising one or more alphanumeric characters including at least one of a customer identifier (ID) or an employee ID;
   parsing at least one country-independent item of the first set of items during a first time interval, wherein the at least one country-independent item is independent from a country of origin associated with the document;
   identifying the country of origin associated with the document based on one or more dependencies in the first set of items during a second time interval, the identifying the country of origin being based, at least in part, on a match of the customer ID or the employee ID with a set of master data, the second time interval occurring after expiration of the first time interval;
   based on the identified country of origin, performing one or more country-dependent operations during at least a third time interval, the third time interval occurring after expiration of the second time interval, to:
   identify additional items in the document,
   parse at least one country-dependent item of the identified first set of items and the additional items,
   determine a relationship between the at least one country-dependent item of the identified first set of items and the additional items, and
   validate the at least one county-independent item and the at least one country-dependent item with the identified first set of items and the additional items based on a set of rules in response to the identifying the additional items, the parsing, and the determination of the relationship; and
   transmitting one or more of the validated at least one county-independent item and the at least one country-dependent item to the remote device in response to the performing the operations.

2. The method of claim 1, wherein the parsing is based on a particular language identified in the document.

3. The method of claim 1, further comprising replacing a name with an identifier in response to the determination of the relationship.

4. The method of claim 1, wherein the parsing comprises converting at least one of the identified items into an independent format.

5. The method of claim 1, wherein the validating is based at least partially on dated-based rules.

6. The method of claim 1, further comprising identifying a country associated with the document based at least partially on one or more of the identified items.

7. The method of claim 1, wherein at least the determining the relationship between the at least one of the country-dependent item and the parsing of the at least one country-dependent item are performed serially.

8. A server, comprising:
   a processor to:
      process one or more electronic signals comprising a document, wherein the one or more electronic signals are received from a remote device;
      identify a first set of items in the document the first set of items including at least one of a customer identifier (ID) or an employee ID;
      parse at least one country-independent item of the first set of items during a first time interval, wherein the at least one country-independent item is independent from a country of origin associated with the document;
      identify the country of origin associated with the document based on one or more dependencies in the first set of items during a second time interval, the identifying the country of origin being based, at least in part, on a match of the customer ID or the employee ID with a set of master data, the second time interval occurring after expiration of the first time interval;
      based on the identified country of origin, performing one or more country-dependent operations during at least a third time interval, the third time interval occurring after expiration of the second time interval, to:
      identify additional items in the document,
      parse at least one country-dependent item of the identified first set of items and the additional items, determine a relationship between the at least one of country-dependent item of the identified first set of items and the additional items, and validate the at least one county-independent item and the at least one country-dependent item with the identified first set of items and the additional items based on a set of rules in response to the identifying the additional items, the parsing, and the determination of the relationship; and initiate transmission of one or more electronic signals comprising one or more of the validated at least one county-independent item and the at least one country-dependent item to the remote device in response to the performance of the operations.

9. The server of claim 8, wherein the processor is to further perform the parsing based on a particular language identified in the document.

10. The server of claim 8, wherein the processor is to further replace a name with an identifier in response to the determination of the relationship.

11. The server of claim 8, wherein the processor is to further convert at least one of the identified items into an independent format.

12. The server of claim 8, wherein the processor is to further perform the validating is based at least partially on dated-based rules.

13. The server of claim 8, wherein the processor is to further identify a country associated with the document based at least partially on one or more of the identified items.

14. The server of claim 8, wherein the processor is to further perform the determining the relationship between the at least one country-dependent item and the parsing of the at least one country-dependent item serially.

15. An article, comprising:
a non-transitory storage medium comprising machine-readable instructions executable by a special purpose apparatus to:
process a document received from a remote device;
identify a first set of items in the document, the first set of items comprising one or more alphanumeric characters including at least one of a customer identifier (ID) or an employee ID;
parse at least one country-independent item of the first set of items during a first time interval, wherein the at least one country-independent item is independent from a country of origin associated with the document;

identify the country of origin associated with the document based on one or more dependencies in the first set of items during a second time interval, the identifying the country of origin being based, at least in part, on a match of the customer ID or the employee ID with a set of master data, the second time interval occurring after expiration of the first time interval;

based on the identified country of origin, performing one or more country-dependent operations during at least a third time interval, the third time interval occurring after expiration of the second time interval, to:
identify additional items in the document,
parse at least one country-dependent item of the identified first set of items and the additional items,
determine of a relationship between the at least one country-dependent item of the identified first set of items and the additional items, and
validate the at least one county-independent item and the at least one country-dependent item with the identified first set of items and the additional items based on a set of rules in response to the identifying the additional items, the parsing, and the determining the relationship; and initiation of transmission of one or more of the validated at least one county-independent item and the at least one country-dependent item to the remote device in response to the performing the operations.

16. The article of claim 15, wherein the parsing is based on a particular language identified in the document.

17. The article of claim 15, wherein the machine-readable instructions are further executable by the special purpose apparatus to replace a name with an identifier in response to the determination of the relationship.

18. The article of claim 15, wherein the parsing comprises converting at least one of the identified items into an independent format.

19. The article of claim 15, wherein the machine-readable instructions are further executable by the special purpose apparatus to identify a country associated with the document based at least partially on one or more of the identified items.

20. The article of claim 15, wherein the machine-readable instructions are further executable by the special purpose apparatus to perform the determination of the relationship between the at least one of the country-dependent item and the parsing of the at least one country-dependent item serially.

* * * * *